(No Model.) 2 Sheets—Sheet 2.
F. KINNEY & W. TANNEHILL.
REVOLVING SULKY SCRAPER.
No. 301,129. Patented July 1, 1884.
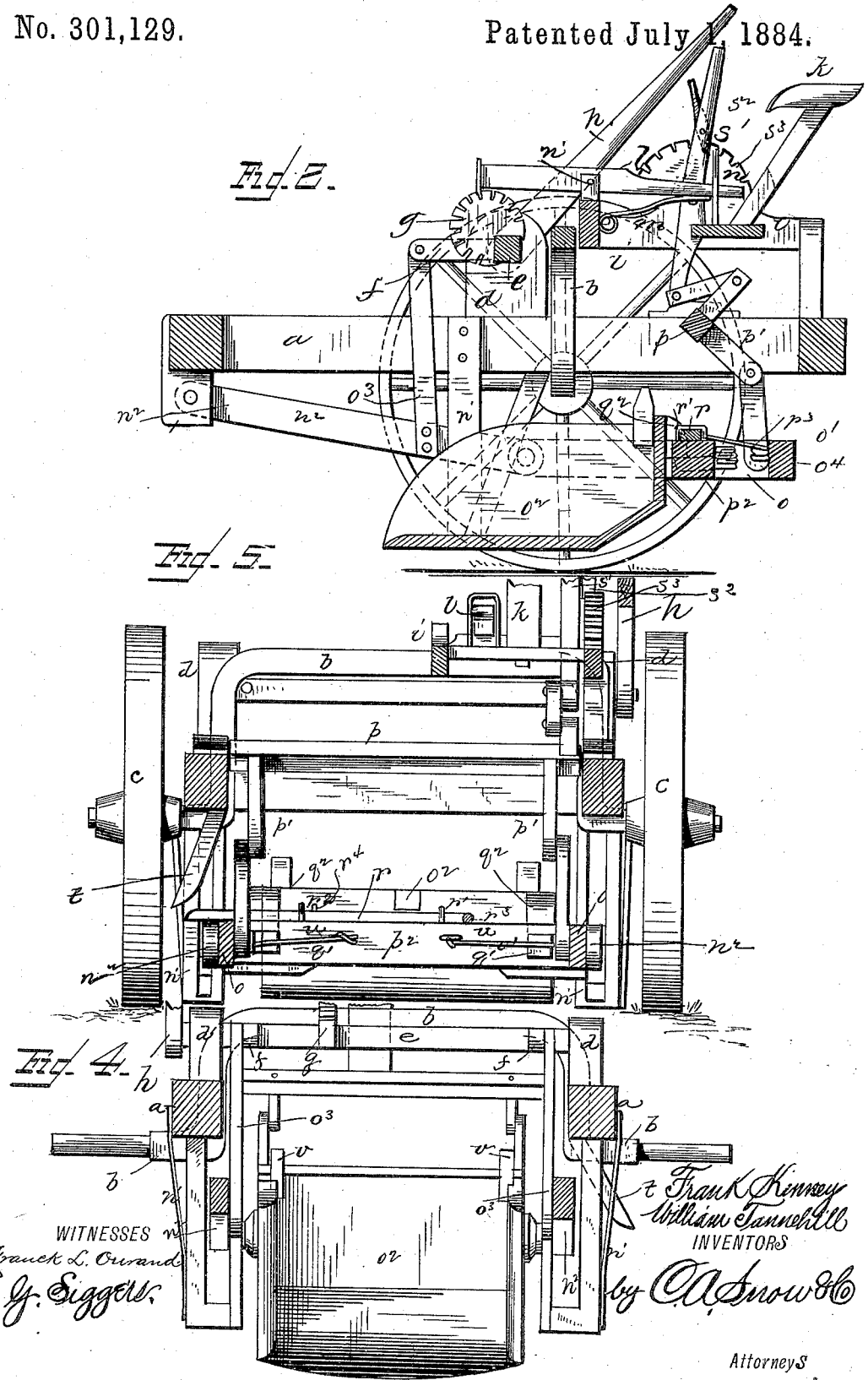

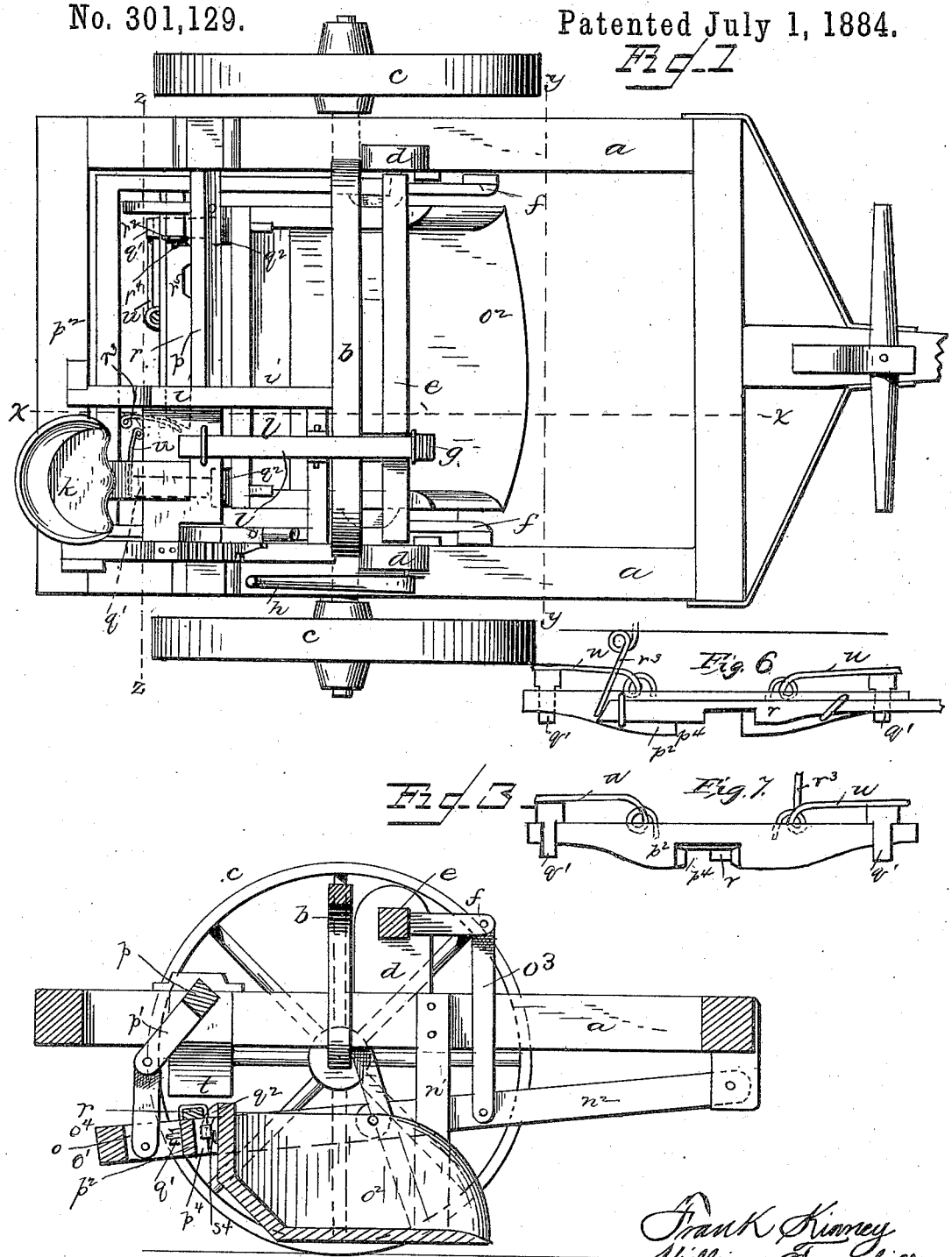

UNITED STATES PATENT OFFICE.

FRANK KINNEY AND WILLIAM TANNEHILL, OF ZANESVILLE, OHIO.

REVOLVING SULKY-SCRAPER.

SPECIFICATION forming part of Letters Patent No. 301,129, dated July 1, 1884.

Application filed January 17, 1884. (No model.)

*To all whom it may concern:*

Be it known that we, FRANK KINNEY and WM. TANNEHILL, both citizens of the United States, residing at Zanesville, in the county of Muskingum and State of Ohio, have invented a new and useful Revolving Sulky-Scraper, of which the following is a specification, reference being had to the accompanying drawings.

Figure 1 is a plan view of a rotary sulky-scraper embodying our improvements. Fig. 2 is a vertical sectional view on the line $x\ x$ in Fig. 1, viewed from the left-hand side of the machine. Fig. 3 is a view on the same line viewed from the right-hand side of the machine. Fig. 4 is a transverse sectional view in front of the wheels on the line $y\ y$, Fig. 1; and Fig. 5 is a transverse sectional view in rear of the wheels on the line $z\ z$, Fig. 1. Fig. 6 is a plan view of the slide $r$, notched cross-rail $p^2$, and springs; and Fig. 7 is a bottom view of the same parts.

This invention has relation to rotary sulky-scrapers; and it consists in the construction and novel arrangement of parts, as will be hereinafter fully described, and particularly pointed out in the claims appended.

Referring by letter to the accompanying drawings, $a$ designates the frame, mounted on the arched axle $b$, journaled in the driving and supporting wheels $c\ c$. In front of the axle $b$ two standards, $d\ d$, rise from the frame $a$, and form bearings for the rock-shaft $e$, carrying the forwardly-projecting arms $f\ f$ and the segmental rack $g$, as shown. The right-hand end of the rock-shaft $e$ is provided with a hand-lever, $h$, which extends back within easy reach of the driver upon the right-hand side of the auxiliary frame $i$, supported on uprights rising from the main frame, its inner side rail abutting against the rear face of the arched axle to support that corner of said frame, which latter supports the driver's seat $k$. To the front rail of the auxiliary frame $i$ is pivoted a foot-pawl, $l$, which is operated by the driver's foot, and is controlled in its movements by a spring, $m$, and a loop, $n$. Stirrup-guides $n'\ n'$ depend from the main frame $a$ immediately in front of the standards $d\ d$, and are strengthened by braces extending from the lower ends of said stirrup-guides up to the journals of the arched axle on the outside of the main frame. Bail-arms $n^2\ n^2$ are pivoted in bearings at the front corners of the main frame, said bearings depending therefrom, and extend back through the guide-stirrups to the scoop $o^2$, which is provided with stops $q^2\ q^2$, having plain lower edges and curved rear faces, the plain edges engaging the slides $q'\ q'$ to hold the scoop in the scooping or scraping position, and the curved edges serving to push the slides back to permit the scoop to assume the normal position after it has been rotated to dump the load. Upon the top of the cross-rail $p^2$ is a notched slide, $r$, which works in guides $r'\ r'\ r^2$, and is held in its normal position by a spring, $r^3$, extending forward from the rear rail of the frame $o'$ and bearing against the inner end of said slide $r$, and a pin, $r^4$, bearing against the intermediate guide, $r^2$. The end of this slide $r$ projects to the left of the frame $o'$, when in its normal position, a short distance, and its notch $r^5$ at this time is not aligned with the notch $p^4$ in the cross-rail $p^2$. The bail-arms $n^2\ n^2$ are connected by pivoted hangers $o^3\ o^3$ to the forward ends of the arms $f\ f$. A second rock-shaft, $p$, having bearings on the main frame near its rear end, is provided with rearwardly-projecting arms $p'\ p'$, which are connected by pivoted hangers to the side rails, $o\ o$, of the frame $o'$ near their rear ends. The frame $o'$ is provided in front of its rear rail with a notched cross-rail, $p^2$, the notch $p^4$ being made about midway of its length in its front edge. This cross-rail $p^2$ is provided near its ends with lateral slots, in which spring-slides $q'\ q'$ operate to form supports for holding the scoop $o^2$ while being filled, to prevent it from rotating backward. The rearward lever, $s'$, pivoted to the inner face of the right-hand rail of the auxiliary frame, is provided with a spring-pawl, $s^2$, which engages a semicircular rack, $s^3$, on said right-hand rail. This lever $s'$ is employed to adjust the frame $o'$, which consists of the side rails, $o\ o$, pivoted at their forward ends between the sides of the scoop and the rear ends of the bail-arms $n^2\ n^2$, the rear cross-rail, $o^4$, and the cross-rail $p^2$, to elevate and depress the rear end of the scoop, and the spring-pawl $s^2$, which slides in guides on said lever, engages the notches in the rack, $s^3$ and holds the frame $o'$ to its adjustment.

The rear wall of the scoop $o^2$ is provided with a stud, $s^4$, which, when the scoop is in its normal position, occupies the notch $p^4$ in the cross-rail $p^2$. The main frame is provided near its rear end on the left hand, in line with the end of the slide $r$, with an inclined guide, $t$, which operates the slide, when it is carried up against it, to move the notch $r^5$ in line with the notch $p^4$, so that the scoop may be rotated, the stud passing up through the notches $p^4$ and $r^5$ to dump the load by simply tripping the foot-pawl, which permits the front end of the scoop to engage with the ground, and as the machine moves forward causes the scoop to make one revolution. The spring-slides $q'$ $q'$ are held in place by springs $u$ $u$, secured to their rear ends and to the rear face of the cross-rail $p^2$ or in any other suitable manner.

The object of the stirrup-guides through which the bail-arms pass, and in which they work vertically, is to prevent the scraper from working laterally. The front of the scraper is raised and lowered and held in position after adjustment by the front hand-lever and the foot pawl or lever, the latter being first disengaged from the segmental rack on the front rock-shaft by a downward pressure of the foot on its rear end, and the front hand-lever is then moved to raise or lower the front of the scraper, as the driver may elect, after which the foot is removed, and the spring of the foot-pawl will throw it back into engagement with its segmental rack, thereby causing the front end of the scraper to be held to its adjustment. The hand-lever provided with the spring-pawl that engages the semicircular rack on the auxiliary frame is to raise and lower the rear part of the scraper, either to cause it to fill or cause it to dump, as may be desired. When the driver pulls the rear hand-lever back, the rear end of the scraper is raised and the dirt enters at the front end of the scraper, which is in engagement with and is being drawn over the ground. The scraper may be held in this position until it is partly filled; or it may be so held until it is completely filled. The load can be manipulated in three different ways, viz: First, the entire load may be dragged; second, one-half of the load may be dragged by elevating the front of the scraper and lowering the rear end of the same; and, third, all of the load may be hauled by raising the scraper clear of the ground.

When the scraper is to be filled, the front or cutting edge of the scoop should be adjusted to engage the ground and enter the dirt, and the rear end of the scoop should be slightly elevated to give the cutting-edge the proper direction. When the scoop has been filled, if it is desired to dump the load at once, the rear end of the scoop is raised by operating the lever $s'$ until the notches $p^4$ and $r^5$ are caused to be aligned, at which time the stud $s^4$ will be caused to pass up through said aligned notches by reason of the fact that the point of the scoop is in the ground and the rear end is elevated and brought forward on the line of an arc, and as the machine moves forward on its wheels the point of the scoop will remain stationary and the rear end will move forward with the main frame, causing the scoop to turn on its pivotal points, and it will consequently be turned over and its contents dumped upon the ground. If, however, it is desired to convey the load of dirt in the scoop to some certain spot at a distance from where the scoop has been filled, the front end of the scoop only should be raised, the rear end being already slightly elevated. The load can then be conveyed to the desired place and dumped by pressing with the foot upon the foot-pawl and raising the rear end of the scraper by pulling the rear lever back and causing the notched slide to engage the inclined guide and bring the notches into line, when the scraper will turn over, as before described, and make an entire revolution, the pins $v$ $v$, projecting above the rear corners of the scraper, engaging the ground at the half-revolution, and causing the scoop to complete the revolution and pass back to its normal position. Thus, by adopting this construction, one man, sitting on the seat, with his team can scrape all day and do as much work as six or eight men using the ordinary scrapers. The scrapers may be made in different sizes. They are cheap, comparatively speaking, are durable, and not likely to get out of order. The depth of the scraper may be so arranged that it will scrape deep or shallow, and the load can be thereby easily gaged by the levers, which are under easy control of the driver.

Having thus fully described our invention, what we claim as new, and desire to secure by Letters Patent, is—

1. In a sulky-scraper, the combination, with the revolving scraper pivoted in a suspended frame and held in place by spring-slides connected with a cross-rail in said frame, of a rock-shaft connected to the bail-arms of said suspended frame by hangers from arms, and provided with a hand-lever and a segmental rack, and a spring foot-pawl fulcrumed in a rigid auxiliary frame on the main frame, whereby the front end of the scraper may be raised, lowered, and set to its adjustment, substantially as specified.

2. In a sulky-scraper, a revolving scraper pivoted in a suspended frame and held in its normal position by a spring-slide on a notched cross-rail of said suspended frame, and an inclined guide depending from the main frame, in combination with a rock-shaft working in bearings near the rear end of the main frame, and connected to the suspended frame by hangers, and provided with a hand-lever having a spring-pawl engaging a semicircular rack on the auxiliary frame that supports the driver's seat, whereby the rear end of the scraper may be raised, lowered, and set to its adjustment, substantially as specified.

3. In a sulky-scraper, a revolving scraper pivoted in bearings in a flexibly-suspended frame, and provided with a rear central stud and curved end stops, in combination with a cross-rail of the rear portion of the suspended frame, provided with a central vertical front notch and slide-springs working in lateral end slots to engage the curved stops on the scraper, and a notched spring-slide on the cross-rail, operated by an inclined guide on the main frame, and levers for raising, lowering, setting, and tripping both ends of the revolving scraper, substantially as specified.

4. In a sulky-scraper, the combination, with the revolving scraper pivoted in bearings in a suspended flexible frame, operated by levers from the main and auxiliary frames to raise, lower, set, and dump the scraper, of the vertically-depending guide-stirrups for preventing lateral movement of the revolving scraper, substantially as specified.

5. In a sulky-scraper, the combination, with the bail-arms pivoted to the front end of the main frame and passed through the stirrup-guides, and connected to the front rock-shaft by hangers, of the frame $o'$, pivoted to the bail-arms and to the revolving scraper, provided with the rear central stud and the curved end stops, said frame $o'$ being connected to the rear rock-shaft by links, and having the cross-rail $p^2$ with the central notch, $p^4$, and the end spring-slides, the notched spring-slide working in guides on said cross-rail, the inclined guide for operating the notched slide, the front lever, back lever, and its rack, and the foot-lever and its rack, substantially as specified.

6. In a sulky-scraper, the revolving scraper pivoted in bearings in a suspended flexible frame, and provided with upwardly-projecting stakes at its rear corners, in combination with the levers and racks for raising, lowering, setting, and tripping the scraper, whereby the last half of the revolution will be completed without dragging the scraper in the inverted position, substantially as specified.

In testimony that we claim the foregoing as our own we have hereto affixed our signatures in presence of two witnesses.

FRANK KINNEY.
WM. TANNEHILL.

Witnesses:
HOWARD ASTON,
JNO. HOOPES.